United States Patent [19]
Logan

[11] 3,793,872
[45] Feb. 26, 1974

[54] FORGING PRESS FEED MECHANISM

[75] Inventor: Warner C. Logan, Timberlake, Ohio

[73] Assignee: The Ajax Manufacturine Company, Cleveland, Ohio

[22] Filed: Sept. 2, 1971

[21] Appl. No.: 177,298

[52] U.S. Cl. .................. 72/422, 214/1 BC, 10/166
[51] Int. Cl. ............................................. B21d 43/10
[58] Field of Search ............... 72/422, DIG. 11, 423; 113/113 R; 10/166; 198/19; 214/1 BC

[56] References Cited
UNITED STATES PATENTS

| | | | |
|---|---|---|---|
| 3,183,532 | 5/1965 | Kull ....................................... | 10/166 |
| 2,058,699 | 10/1936 | Lehman ................................ | 72/422 |
| 2,553,808 | 5/1951 | Brugger ................................ | 10/166 |
| 3,452,577 | 7/1969 | Schmeltzer ........................... | 72/427 |

Primary Examiner—Charles W. Lanham
Assistant Examiner—Robert M. Rogers
Attorney, Agent, or Firm—John W. Renner

[57] ABSTRACT

A vertical forging press feeding mechanism to transfer a heated billet from outside the press to the beam transfer pick-up station including a conveyor for transporting heated billets and a stock loading arm for receiving the billets from said conveyor, the generally horizontally extending stock loading arm being mounted on two parallel levers adapted to be driven for oscillation in timed relationship to both the conveyor and the beam transfer mechanism, whereby the stock feed arm upon reception of the billet swings upwardly through a limited arcuate path to deliver such billet to the beam transfer pickup station and subsequently returns to a position adjacent the conveyor for repeating the feed cycle.

17 Claims, 4 Drawing Figures

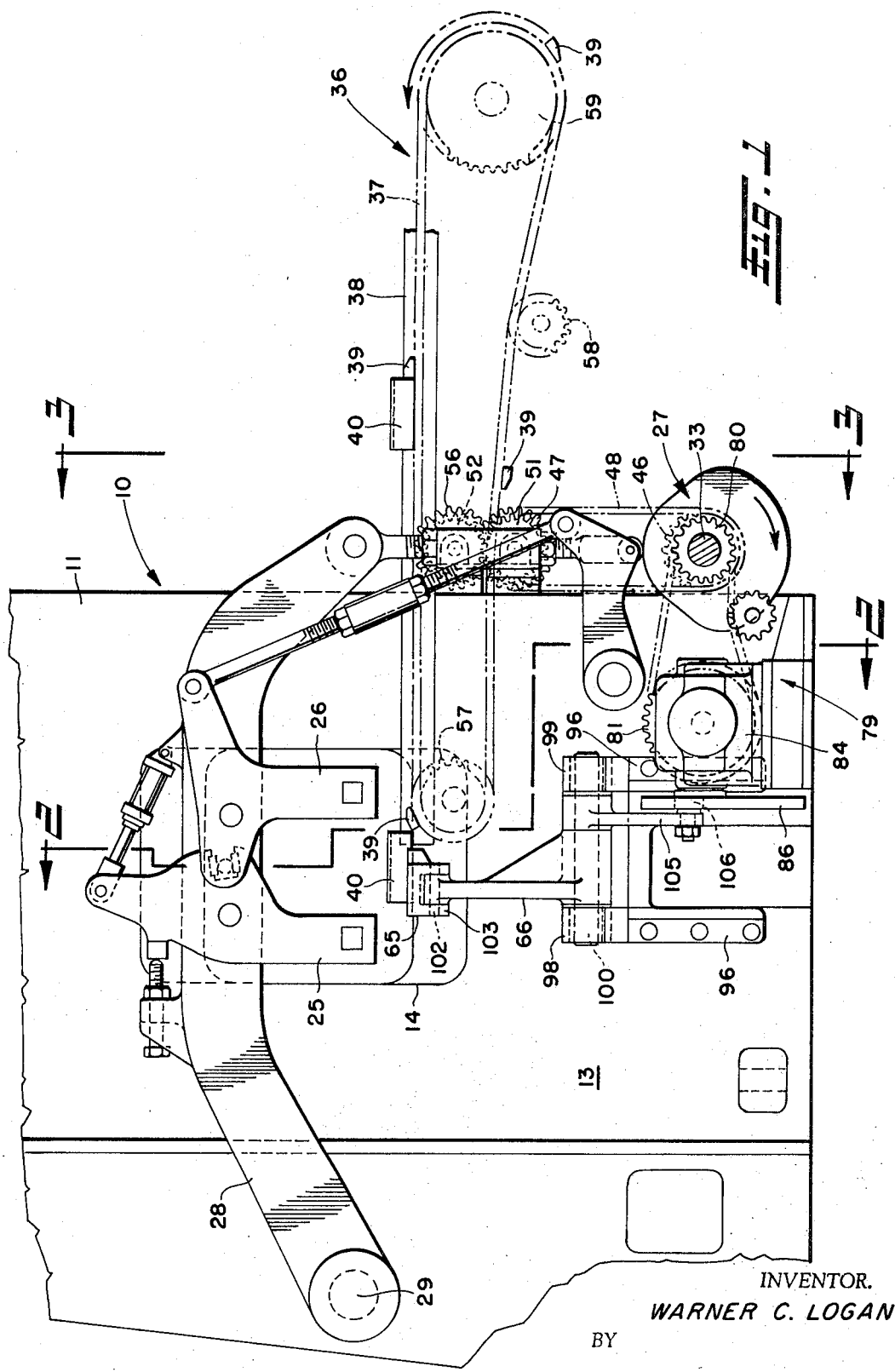

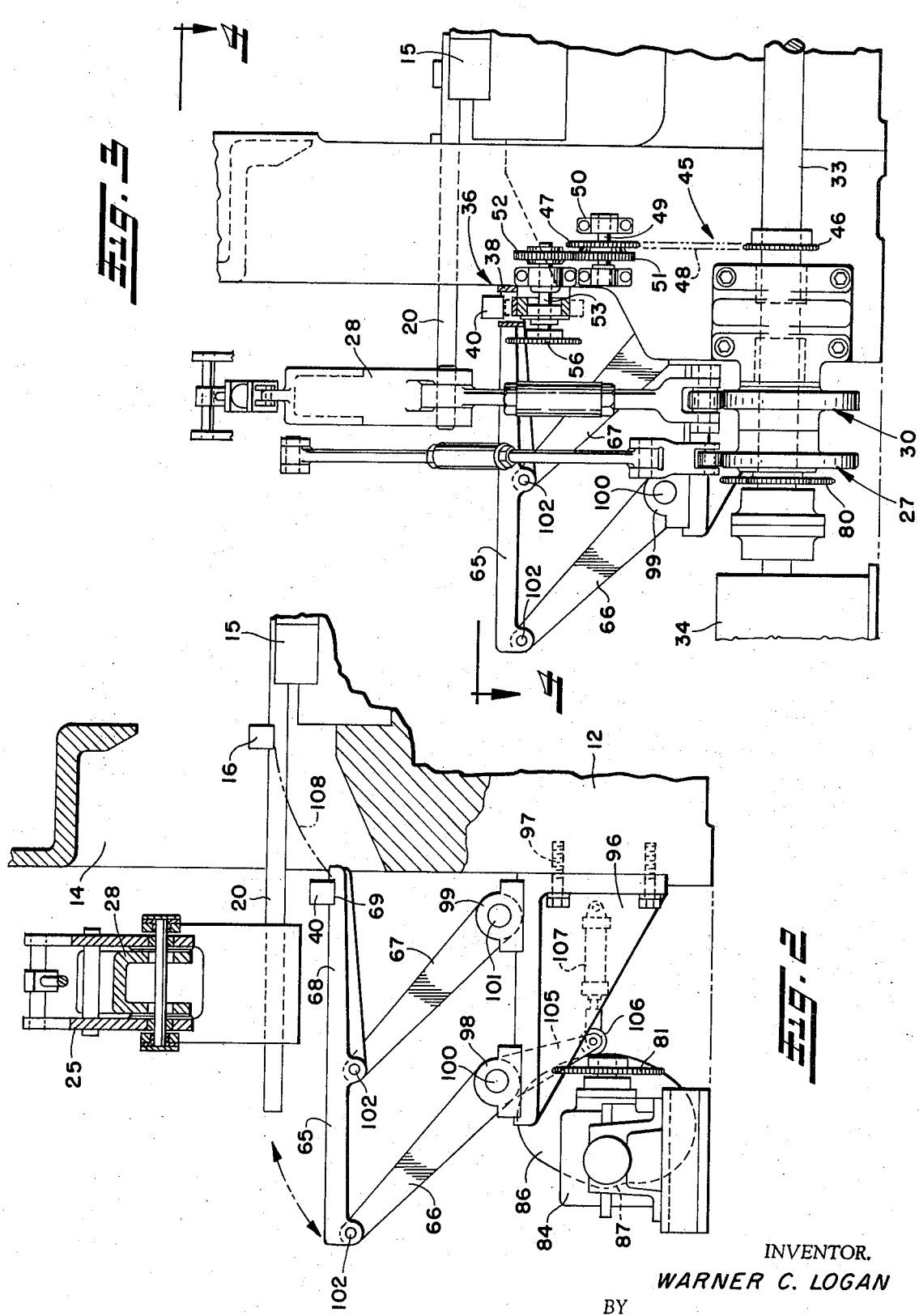

INVENTOR.
WARNER C. LOGAN

FORGING PRESS FEED MECHANISM

The present invention relates as indicated to a feeding mechanism for a forging press and, more particularly, to a feeding mechanism adapted automatically and continually to feed heated billets to the press transfer means for subsequent sequential movement though multiple dies.

An example of a prior art feed mechanism for a vertical forging press may be seen in Jacobs, U. S. Pat. No. 3,025,731. In addition, many vertical presses are hand fed by the operator in attendance. Such feed methods do not always provide maximum part production since the feed is not automatic and continuous and is generally not interrelated with or dependent upon operation of the press transfer means.

It is the principal object of the present invention to provide a feed mechanism that continuously and automatically feeds heated billets to the pickup point for the forging press beam transfer means.

Another principal object is to provide a feed mechanism that is operatively synchronized with the transfer means of the press, whereby parts may be continuously manufactured at a given production rate. The synchronization is effected through a common drive for the feed and transfer mechanisms.

Still another important object of the invention is to provide a feed device wherein the stock feed arm and conveying element are mounted directly to the press frame, such mounting maintaining the alignment of the feed mechanism with the press. Therefore, if the press shifts slightly due to repeated vibrations caused by die closing, the feed mechanism will likewise shift, and the alignment therebetween will be maintained.

Other objects and advantages of the present invention will become apparent as the following description proceeds.

To the accomplishment of the foregoing and related ends, the invention, then, comprises the features hereinafter fully described, the following description and the annexed drawings setting forth in detail a certain embodiment of the invention, this being indicative, however, of but one of the various ways in which the principles of the invention may be employed.

In said annexed drawings:

FIG. 1 is a side elevation of a forging machine incorporating a feeding mechanism in accordance with the present invention;

FIG. 2 is a fragmentary front elevation partially broken away and in section taken along line 2—2 of FIG. 1;

FIG. 3 is a fragmentary front elevation taken substantially on the line 3—3 of FIG. 1.

Figure 4:
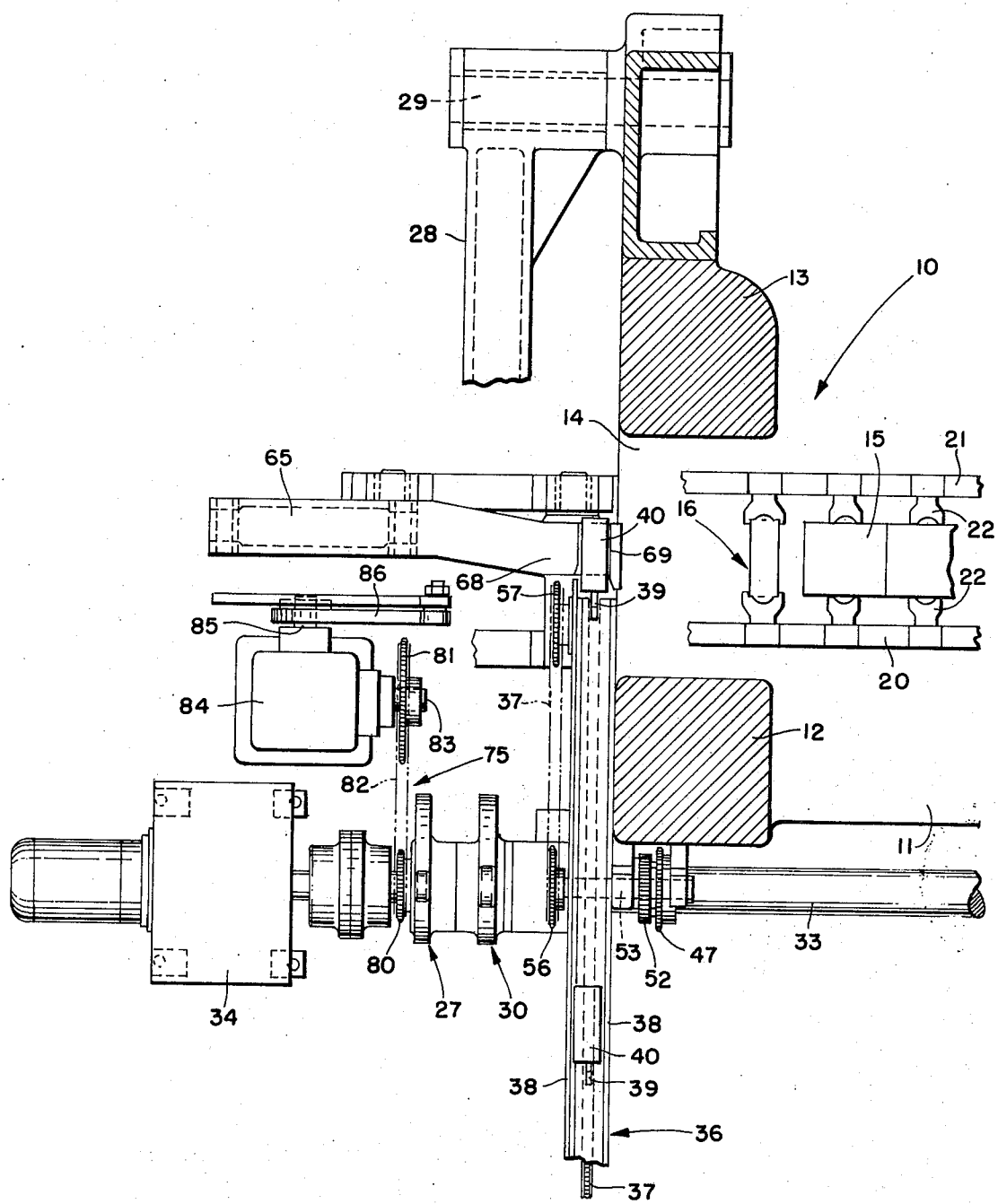
FIG. 4 is a horizontal section through the press taken substantially along line 4—4 of FIG. 3, with certain parts being broken away for clarity of illustration.

Referring now in more detail to the drawings and initially to FIGS. 1 and 4, the vertical, multiple die set, forging press 10 has an upstanding one-piece steel frame 11 which includes four massive columns, two of which are shown in FIG. 4 at 12 and 13. Such columns form lateral windows in the frame, with feed window 14 being defined by columns 12 and 13.

There may be four longitudinally spaced dies 15 within press 10 sequentially to bust-block-finish and trim a heated billet moving from left to right therethrough as viewed in FIG. 4. The heated billet is removed from a furnace (not shown) and delivered to pick-up station 16 by the feed mechanism of the present invention. From the pick-up station, the billet is transferred from die to die by the beam transfer mechanism disclosed and claimed in applicant's copending application Ser. No. 177,222 filed Sept. 2, 1971, entitled "Forging Press Transfer Mechanism."

Briefly, such transfer mechanism includes two horizontally positioned and laterally spaced beams 20 and 21 which are situated fore and aft, respectively, of the forging dies. Each of the beams have inwardly extending transfer fingers 22 adapted to engage and hold the sides of the billet positioned therebetween. The fingers 22 are moved into and out of engagement with the heated billet by pivoting beams 20 and 21 simultaneously inwardly and outwardly. Such pivotal movement is effected by similar pairs of levers 25 and 26 at each end of the press that support the distal ends of the beams outside frame 11, the levers being pivotally actuated by cam mechanism 27. The beams are moved vertically to remove and deposit billets in the multiple dies by substantially horizontal levers 28 at both sides of the press, such levers being pivoted about axis 29 by camming mechanism 30 shown in FIG. 3. The beams 20 and 21 are horizontally reciprocated for the transfer movement and return by a cam transfer mechanism (not shown) positioned at the opposite side of press 10.

The three cam operated mechanisms that control beam movement are driven in common by cam output shaft 33 of gear motor unit 34. Such common drive permits the spatial movements of the beams to be synchronized for a proper transfer cycle sequence.

THE FEED MECHANISM

Referring initially to FIGS. 1, 3 and 4, the feed mechanism includes an endless conveyor 36 having a chain belt 37 and two parallel, side guide plates 38. The conveyor 36 may be mounted by suitable fastening means to column 12 of the forging press. A plurality of pairs of lugs or dogs 39 are spaced along belt 37, such lugs preferably being removable so that the size and shape of the lugs may be varied. The conveyor, at its right hand end as viewed in FIG. 1, passes through a furnace and automatically receives therein heated billets that are picked up by lugs 39.

The conveyor 36 is driven by a chain transmission or take-off 45 from shaft 33. The chain transmission includes drive sprocket 46 that is keyed to shaft 33 and drives sprocket 47 by chain 48. Sprocket 47 is fast on idler shaft 49, such shaft being journalled in pillow blocks 50 mounted on the front of column 12. Change gear 51 is keyed to idler shaft 49 and in mesh with pinion 52 secured to one end of conveyor drive shaft 53. Transfer sprocket 56 is keyed to the other end of shaft 55 and drives belt drive sprocket 57 by the chain drive seen in FIG. 4. The chain belt is also supported by idler sprockets 58 and 59.

The discharge end of conveyor 36 is adjacent horizontally extending stock feed arm 65, in the reception position thereof, such feed arm being operative to feed the heated billet to pick-up station 16, as will be described in more detail hereinafter. Referring to FIG. 2, stock feed arm 65 is pivotally supported by parallel upstanding levers 66 and 67 of equal length. The distal end 68 of feed arm 65 is offset for alignment with the conveyor 36 and transfer mechanism, as best shown in FIG. 4, and is provided with a transverse slide or groove 69 extending across the width of the arm. When the stock feed arm 65 is in the position shown in FIGS. 2 and 3, groove 69 is in longitudinal alignment with belt 37 of conveyor 36. The leading end of heated billet 40 slides into closely adjacent groove 69 in stock feed arm 65 at the end of the transfer flight of conveyor 36, the lugs 39 pushing billet 40 further into the groove until such lug loses contact therewith by passing around sprocket 57 to begin its return flight. The groove 69 in the illustrated embodiment preferably is on the order of nine inches long, and the billet may selectively be positioned in such groove by varying the height of removable lugs 39, thereby to control the distance pushed before release. It will be appreciated that side guides 38 and lugs 39 of the conveyor maintain the billets 40 in a proper longitudinal orientation to be received in groove 69.

The stock feed arm 65 is driven by a chain take-off or transmission 79 from cam shaft 33, such transmission including chain sprocket 80 that is keyed to cam drive shaft 33 and drives follower sprocket 81 by chain 82, as best shown in FIG. 1. Follower sprocket 81 is keyed to input shaft 83 of miter gear box 84. The output shaft 85 of the miter gear box rotates cam 86 that is eccentrically keyed thereto as shown in FIG. 2. The transmission is designed to effect a 2 to 1 reduction from cam shaft 33 so the feed mechanism will operate once for every two cycles of the transfer mechanism.

The cam 86 is of oblong configuration to effect rapid movement of the stock feed arm between loading and unloading positions and to provide dwell periods at such positions. One elongated side of the cam is provided with an arcuate notch 87 to act as a cam follower stop, as will be described in more detail hereinafter.

The mounting for feed arm 65 includes two large L-shape brackets 96 that are attached to frame 11 adjacent the bottom thereof by suitable fastening means 97. Two pairs of pillow blocks 98 and 99 are secured to the horizontal legs of brackets 96 and have pivot shafts 100 and 101, respectively, journalled therein. The bottom ends of upstanding parallel levers 66 and 67 are keyed to shafts 100 and 101, respectively, for pivotal movement therewith. The upper ends of levers 66 and 67 support feed arm 65 by pivotal connections effected by pins 102 journalled in bifurcated portions 103 on the bottom of feed arm 65.

A downwardly extending camming arm 105 is keyed at its upper end to shaft 100 as best shown in FIG. 1. The lower end of arm 105 rotatably supports cam follower 106 that is urged against the surface of cam 86 by air spring 107. Thus as a safety feature, the hot billet moves upwardly through the arc 108 by the action of the air spring as controlled by cam 86. The return empty stroke is by direct action of the cam.

It is to be noted that both the conveyor 36 and transfer feed arm 65 are mounted on the forging press. This requires the component elements of the feed mechanism to maintain alignment with the forging press.

OPERATION

The feeding operation is initiated by removal of heated billet 40 from the furnace by lugs 39 on chain belt 37. The billet is pushed into groove 69 at the distal end 68 of stock feed arm 65 by belt 37 and lug 39, with the particular position of the billet in groove 69 being controlled by the height of such lug. The conveyor is driven by chain transmission from transfer cam shaft 33. The spacing of the lugs and the speed of the conveyor is selected to provide a hot billet for each of the feed strokes of arm 65.

Upon reception of the heated billet, stock feed arm 65 is swung arcuately upwardly to pick-up point 16 for the beam transfer mechanism. The arcuate movement is effected by the air spring 107 as controlled by cam 86 driven by cam shaft 33. Specifically, rotation of eccentrically mounted cam 86 from its FIG. 2 position will permit the air spring to swing arm 105 in a clockwise direction thereby to impart similar pivotal movement to shaft 100. Such movement will drive lever 66 in a clockwise direction arcuately to swing stock feed arm 65 to the beam transfer pick-up station 16. The position of the stock feed arm at the beam transfer pick-up station is accurately maintained or controlled by cam follower 106 being received in stop groove 87 formed in cam 86. It will be appreciated that the configuration of the cam 86 and the eccentric mounting thereof enables the stock feed arm relatively rapidly to be moved between reception and unload positions, with such arm having dwell periods at each of the respective positions.

The billet is then removed from the feed arm and cycled through the multiple die set forging press by the beam transfer mechanism.

Upon removal of the billet, the arm is returned along its arcuate path 108 to the billet reception position adjacent conveyor 36. Such movement, of course, is effected by further rotation of cam 86 resulting in counterclockwise movement of arm 105, lever 66, and lever 67.

Since conveyor 36, feed arm 65, and the beam transfer means are commonly driven by cam shaft 33, the feeding and transfer movements of the heated billets are synchronized. The conveyor speed and lug spacing are adapted to deliver a heated billet to the feed arm at the reception phase of its operational cycle. For example, the feed arm completes a cycle every 8 seconds which is half as fast as the transfer device cycle due to the two to one reduction effected by transmission 79. Accordingly, the beam transfer device picks up a heated billet at station 16 on every other cycle.

It is now believed apparent that there is provided a forging machine feeding mechanism which can run continuously and cycle the heated billets from the furnace to the beam transfer of the press. All the movements of the feeding device are accomplished by a mechanism located outside the press, such mechanism being operative likewise to drive the transfer beams whereby the feeding and transfer of the heated billets is fully synchronized.

In addition, it will be appreciated that a method for feeding heated billets to a transfer means has also been described. Such method includes the steps of heating the billets, conveying the billets to a stock feed arm, and reciprocally swinging the feed arm to deliver the billets upwardly and inwardly to the beam transfer pick-up station.

The embodiments of the invention in which an exclusive property or privilege is claimed are defined as follows:

1. A mechanism for feeding stock from a furnace to a transfer device of a forging press comprising a conveyor for transporting heated stock from the furnace, a feed arm cyclicly to receive stock from said conveyor for delivery to said transfer device, and means to oscillate said feed arm in a substantially horizontal orientation between said conveyor and said transfer device, wherein said means to oscillate said feed arm includes upstanding levers of equal length adapted to support said feed arm.

2. The mechanism of claim 1 wherein the stock feed arm is substantially transversely positioned with respect to said conveyor and has a groove therein aligned with said conveyor for reception of such billets.

3. The mechanism of claim 1 wherein said stock feed arm is oscillated by a drive means operative likewise to drive the transfer means and conveyor, the common drive for said feed arm, transfer means, and conveyor permitting operational sequences of the same to be synchronized.

4. The mechanism of claim 1 wherein said levers are secured at the bottom thereof to an actuating pivot shaft that is oscillated by cam means.

5. The mechanism of claim 4 wherein the cam means includes a rotating cam and a cam follower, the latter being mounted on the end of an arm keyed to said pivot shaft.

6. The mechanism of claim 5 wherein the cam follower is biased into continuous engagement with said cam by an air spring.

7. The mechanism of claim 5 wherein the cam has a profile whereby the arm quickly moves between the two positions but dwells adjacent and in such positions.

8. The mechanism of claim 1 wherein both the conveyor and feed arm are mounted on the press frame, whereby alignment of the feed mechanism with the transfer mechanism is maintained.

9. The mechanism of claim 5 wherein the cam means includes a spring holding said follower on said cam, the feed stroke of the feed arm being obtained by the force of the spring as controlled by said cam.

10. A mechanism for feeding stock to a transfer device of a forging press comprising a feed arm adapted to receive stock at a loading position and to have such stock removed at an unloading position in the forging press, and oscillation means to oscillate the feed arm through a delivery and return stroke cycle between the loading and unloading positions, said oscillation means including biasing means positively to force the feed arm through the delivery stroke, the feed arm being supported by two levers of equal length adapted to maintain the feed arm in a substantially horizontal orientation throughout the delivery and return stroke cycle.

11. The mechanism set forth in claim 10 wherein a groove extends across the top surface of the feed arm, the stock being selectively positioned within said groove for delivery to the unloading position.

12. The mechanism set forth in claim 11 wherein a conveyor with pushing dogs delivers the stock to said feed arm, the position of the stock in said feed arm groove being controlled by the height of the dogs.

13. The mechanism of claim 10 wherein the oscillation means includes a pivot shaft and cam means to oscillate said pivot shaft, said levers supporting said feed arm being secured to said pivot shaft.

14. The mechanism of claim 13 wherein said cam means includes an oblong cam and a cam follower mounted to an arm keyed to the pivot shaft, said cam follower being urged against said oblong cam by said biasing means.

15. The mechanism of claim 14 wherein the oblong cam is actuated by a drive means adapted simultaneously to cycle the transfer device and to operate the conveyor.

16. The mechanism of claim 15 wherein the cam is eccentrically keyed to said drive means to permit the biasing means positively to drive the feed arm during the delivery stroke under the control of said cam, said feed arm being driven by said cam during the return stroke.

17. A mechanism for feeding stock to a transfer device of a forging press comprising a feed arm adapted to receive stock at a loading position and to have such stock removed at an unloading position in the forging press and oscillation means to oscillate the feed arm through a delivery and return stroke cycle between the loading and unloading positions, said oscillation means including biasing means resiliently yet positively to force the feed arm through the delivery stroke.

* * * * *